United States Patent Office 2,890,234
Patented June 9, 1959

2,890,234

PHENYLMETHYLTRISILOXANES

Herbert J. Fletcher and Gus L. Constan, Midland, Mich., assignors to Dow Corning Corporation, Midland, Mich., a corporation of Michigan No Drawing. Application January 3, 1957
Serial No. 632,277

4 Claims. (Cl. 260—448.2)

This application relates to novel trisiloxanes and is a continuation-in-part of applicants' copending application Serial No. 539,272, filed October 7, 1955, now abandoned.

It is known that certain fluid organosiloxanes can be employed in vacuum diffusion pumps. It has been shown in U.S. Patents 2,611,774 and 2,530,356 that the organosiloxanes heretofore employed for this use give a good ultimate vacuum and that they have the added advantage of being free from the undesirable thermal decomposition which is encountered with organic oils. As a result of their superior thermal stability coupled with good evacuating capacity, the organosiloxane fluids of the type described in the above patents have met with commercial success in low vacuum operations.

In spite of these advantages, however, it has been found that the organosiloxane fluids heretofore employed were not as good with respect to the ultimate vacuum obtained and with respect to pumping time as certain hydrocarbon oils, particularly those sold under the name Apiezon C. The silicones, of course, have good advantage over these hydrocarbon oils with respect to thermal stability. The applicants have discovered most unexpectedly that the organopolysiloxanes claimed hereinafter give unexpectedly good results when employed as vacuum diffusion pump fluids.

It is the object of this invention to provide a novel composition of matter which gives improved results in vacuum diffusion pumps over any fluids heretofore known. Another object is to provide organopolysiloxane fluids which give better pumping properties than organic fluids without sacrificing thermal stability. Other objects and advantages will be apparent from the following description.

This invention relates to compounds of the formula $$\text{Ph}_2\text{MeSiO}\underset{R}{\overset{Me}{\text{Si}}}\text{OSiPh}_2\text{Me}$$

in which R is methyl or phenyl.

In this invention the radicals phenyl and methyl are shown by the symbols Ph and Me respectively.

The novel compositions of this invention may be prepared in a variety of ways such as by the cohydrolysis of the corresponding chlorosilanes or by catalytic copolymerization of tetraphenyldimethyldisiloxane with dimethylsiloxane or phenylmethylsiloxane or the reaction of the sodium salt of diphenylmethylsilanol with dimethyldichlorosilane or phenylmethyldichlorosilane. However, all of the above methods give relatively low yields of the desired compound or are difficult to carry out.

The best method of preparing the compositions of this invention is that of reacting diphenylmethylsilanol with dimethyldichlorosilane or phenylmethyldichlorosilane in the presence of a hydrogen halide acceptor such as pyridine. The reaction is best carried out at a temperature below 100° C. and the hydrogen halide acceptor should be employed in amount at least sufficient to react with all the HCl.

The compositions of this invention are fluids and give unexpectedly superior results in vacuum pumps even over their closest analogue, namely the compound 1,3,3,5-tetraphenyl-1,1,5,5-tetramethyltrisiloxane and 1,3,5-triphenyl-1,1,3,5,5-pentamethyltrisiloxane. The compositions of this invention also give superior results to those obtained with the mixed siloxane fluids which have heretofore been employed in commercial operations such as those described in U.S. Patent 2,530,356.

The following examples are illustrative only and should not be construed as limiting the invention which is properly delineated in the appended claims.

Example 1

2150 g. of diphenylmethylsilanol were mixed with 817 g. of pyridine and slowly added to a solution of 647.5 g. of dimethyldichlorosilane in 86 g. of pyridine. During the addition the reaction mixture was cooled in an ice-water bath so that the temperature was below 25° C. During the addition 200 ml. of toluene were added in order to decrease the viscosity of the reaction mixture. At the end of the reaction an additional 1800 ml. of toluene was added and the solution was washed free of pyridine and pyridine hydrochloride. Washing was continued until the odor of pyridine was no longer apparent. The toluene was then removed by distillation and the residue fractionated to give a 57% by weight yield of the compound

$$\text{Ph}_2\text{MeSiO}\underset{}{\overset{Me_2}{\text{Si}}}\text{OSiMePh}_2$$

which had the following physical properties: boiling point 188° C. at .5 mm., freezing point −35° C., viscosity at 25° C. 37.2 cs., $n_4^{25}$ 1.5561 and sp. gr. at 25° C. 1.066.

This compound was tested in a vacuum diffusion pump and was found to have a steeper vapor pressure temperature curve than other types of siloxanes. This means that the siloxane gave a superior ultimate vacuum without sacrificing backing pressure performance. The superiority of the siloxane over other siloxanes was apparent both in fractionating and nonfractionating pumps. It gives a significantly faster pump-down time in fractionating pumps than heretofore known siloxanes or the best hydrocarbon oils.

Example 2

5964 g. of a toluene solution containing 2310 g. of diphenylmethylsilanol was added with agitation and stirring over a period of 3½ hours to a solution of 1030 g. of phenylmethyldichlorosilane and 940 g. of pyridine in 1000 g. of toluene. The temperature was maintained between 25 and 35° C. throughout the addition. The solid pyridine hydrochloride was removed from the mixture by washing with water.

The toluene solution was heated to remove the solvent and the silicone product was fractionated to obtain the compound 1,1,3,5,5-pentaphenyl - 1,3,5-trimethyltrisiloxane, boiling about 225° C. at .5 mm. This material had the following properties: a viscosity at 25° C. of 165 cs., $n_D^{25}$ 1.5785, $d_4^{25}$ 1.0950 and a freezing point of −15° C.

This fluid was tested in a high vacuum diffusion pump and was found to give an ultimate vacuum of $2.1 \times 10^{-7}$ mm.

Under identical conditions the best known hydrocarbon oil gives an ultimate vacuum of $4.7 \times 10^{-7}$ mm. and previously employed siloxane diffusion pump fluids give an ultimate vacuum of $1.1-6.0 \times 10^{-6}$ mm.

That which is claimed is:

1. A composition of matter having the formula

where R is selected from the group consisting of phenyl and methyl radicals.

2. As a composition of matter the compound 1,1,5,5-tetraphenyl-1,3,3,5-tetramethyltrisiloxane.

3. As a composition of matter the compound 1,1,3,5,5-pentaphenyl-1,3,5-trimethyltrisiloxane.

4. The method which comprises reacting diphenylmethylsilanol with a composition selected from the group consisting of dimethyldichlorosilane and phenylmethyldichlorosilane, at a temperature below 100° C. in the presence of pyridine in amount at least sufficient to react with all the HCl produced.

References Cited in the file of this patent
UNITED STATES PATENTS

| | | |
|---|---|---|
| 2,469,890 | Patnode | May 10, 1949 |
| 2,547,944 | Iler | Apr. 10, 1951 |
| 2,567,110 | Hyde | Sept. 4, 1951 |
| 2,611,774 | Tyler | Sept. 23, 1952 |
| 2,780,636 | Wright et al. | Feb. 5, 1957 |

OTHER REFERENCES

Hyde et al.: "Jour. Amer. Chem. Soc.," vol. 75 (1953), pp. 5615–8, p. 5617 relied.

UNITED STATES PATENT OFFICE
CERTIFICATE OF CORRECTION

Patent No. 2,890,234

June 9, 1959

Herbert J. Fletcher et al.

It is hereby certified that error appears in the printed specification of the above numbered patent requiring correction and that the said Letters Patent should read as corrected below.

Column 1, line 61, for "on the" read -- or by the --.

Signed and sealed this 20th day of October 1959.

(SEAL)
Attest:
KARL H. AXLINE
Attesting Officer

ROBERT C. WATSON
Commissioner of Patents